US00RE45898E

(19) United States
(12) Reissued Patent
Maidla et al.

(10) Patent Number: US RE45,898 E
(45) **Date of Reissued Patent: *Feb. 23, 2016**

(54) METHOD AND APPARATUS FOR DIRECTIONAL DRILLING

(71) Applicant: Schlumberger Technology Corporation, Sugar Land, TX (US)

(72) Inventors: Eric E. Maidla, Sugar Land, TX (US); Marc Haci, Houston, TX (US)

(73) Assignee: Schlumberger Technology Corporation, Sugar Land, TX (US)

( * ) Notice: This patent is subject to a terminal disclaimer.

(21) Appl. No.: 13/854,058

(22) Filed: Mar. 30, 2013

Related U.S. Patent Documents

Reissue of:
(64) Patent No.: 6,802,378
Issued: Oct. 12, 2004
Appl. No.: 10/325,639
Filed: Dec. 19, 2002

(51) Int. Cl.
*E21B 44/00* (2006.01)

(52) U.S. Cl.
CPC ..... *E21B 44/00* (2013.01)

(58) Field of Classification Search
USPC ..... 175/24, 26, 27, 40, 45, 61
See application file for complete search history.

(56) References Cited

U.S. PATENT DOCUMENTS

| | | | | |
|---|---|---|---|---|
| 4,450,393 A | | 5/1984 | Kohzai | 318/592 |
| 4,492,276 A | | 1/1985 | Kamp | 175/61 |
| 4,535,972 A | | 8/1985 | Millheim et al. | 254/277 |
| 4,854,397 A | | 8/1989 | Warren et al. | 175/26 |
| 4,876,886 A | | 10/1989 | Bible et al. | 73/152.45 |
| 4,958,125 A | | 9/1990 | Jardine et al. | 324/162 |
| 5,205,163 A | | 4/1993 | Sananikone | 73/152.48 |
| 5,237,539 A | | 8/1993 | Selman | 367/69 |
| 5,259,468 A | | 11/1993 | Warren | 175/45 |
| 5,390,748 A | | 2/1995 | Goldman | 175/24 |
| 5,433,279 A | | 7/1995 | Tessari | 173/213 |
| 5,465,799 A | * | 11/1995 | Ho | 175/61 |
| 5,467,832 A | | 11/1995 | Orban et al. | 175/45 |

(Continued)

FOREIGN PATENT DOCUMENTS

| | | | |
|---|---|---|---|
| EP | 0774563 A2 | 5/1997 | E21B 21/10 |
| GB | 591922 | 9/1947 | E21B 3/025 |
| GB | 596715 | 1/1948 | E21B 3/025 |

OTHER PUBLICATIONS

Halsey G.W. et al., "Torque Feedback Used to Cure Slip-Stick Motion," 63rd Annual Technical Conference and Exhibition of the Society of Petroleum Engineers held in Houston, TX, Oct. 2-5, 1968, SPE, Society of Petroleum Engineers, 6 pages, Oct. 2, 1968.

(Continued)

*Primary Examiner* — William P Neuder
(74) *Attorney, Agent, or Firm* — Richard A. Fagin

(57) ABSTRACT

A method of and system for directional drilling reduces the friction between the drill string and the well bore. A downhole drilling motor is connected to the surface by a drill string. The drilling motor is oriented at a selected tool face angle. The drill string is rotated at said surface location in a first direction until a first torque magnitude without changing the tool face angle. The drill string is then rotated in the opposite direction until a second torque magnitude is reached, again without changing the tool face angle. The drill string is rocked back and forth between the first and second torque magnitudes.

37 Claims, 2 Drawing Sheets

(56) References Cited

U.S. PATENT DOCUMENTS

| | | | | |
|---|---|---|---|---|
| 5,474,142 | A | 12/1995 | Bowden | 175/27 |
| 5,738,178 | A | 4/1998 | Williams et al. | 175/61 |
| 5,842,149 | A | 11/1998 | Harrell et al. | 702/9 |
| 6,050,348 | A * | 4/2000 | Richarson et al. | 175/26 |
| 6,802,378 | B2 | 10/2004 | Haci et al. | 175/26 |
| 6,918,453 | B2 * | 7/2005 | Haci et al. | 175/26 |
| 2002/0104685 | A1 * | 8/2002 | Pinckard et al. | 175/61 |

OTHER PUBLICATIONS

Brett, J.F. et al., "Field Experiences with Computer-Controlled Drilling," SPE, Society of Petroleum Engineers, SPE 20107, 1990 Permian Basin Oil and Gas Recovery Conference held in Midland, Texas, Mar. 8-9, 1990, 16 pages, Mar. 8, 1990.

Bonner, Steve et al., "Measurements at the Bit: A New Generation of MWD Tools," Oilfield Review, Apr./Jul. 1993, 11 pages, Apr. 1993.

Jackson, Bryan et al., "Portable Top Drive Cuts Horizontal Drilling Costs," World Oil, 5 pages, Nov. 1993.

Pinka, Ján et al., "TDS—Top Drive System, New Drilling Technology," Acta Montanistica Slovaca, vol. 1(4), 7 pages, 1996.

Brouse, Michael, Economic/Operational Advantages of Top Drive Installations, World Oil, 5 pages, Oct. 1996.

Murch, Colin B., "Application of Top Drive Drilling to Horizontal Wells," 1996 SPE Horizontal Well Technology Conference, Alberta, Canada, Society of Petroleum Engineers, 4 pages, Nov. 18, 1996.

Laurent, Michael et al., "Hydraulic Rig Supports Casing Drilling," World Oil, 4 pages, Sep. 1999.

Case 6:09-cv-00414-LED Document 102 Filed Mar. 18, 2011, Defendants' Joint Motion to Amend Invalidity Contentions, 177 pages, Mar. 18, 2011.

Case 6:09-cv-00414-LED Document 114 Filed Mar. 30, 2011, Plaintiff Canrig Drilling Technology Ltd.'s Response to Defendants' Joint Motion to Amend Invalidity Contentions, 70 pages, Mar. 30, 2011.

Case 6:09-cv-00414-LED Document 124-2 Filed Apr. 11, 2011, Tesco Drilling Technology, Portable Top Drive Drilling System, "The Future of Drilling," 3 pages, Apr. 11, 2011.

Case 6:09-cv-00414-LED Document 124 Filed Apr. 11, 2011, Defendants' Reply to Canrig's Response to Defendants' Motion to Amend Invalidity Contentions, 32 pages, Apr. 11, 2011.

Case 6:09-cv-00414-LED Document 130 Filed Apr. 12, 2011, Defendants' Reply to Canrig's Response to Defendants' Motion to Amend Invalidity Contentions, 27 pages, Apr. 12, 2011.

Case 6:09-cv-00414-LED Document 167 Filed May 13, 2011, *Canrig Drilling Technology Ltd.* v. *Omron Oilfield and Marine, Inc., and Helmerich & Payne, Inc.*, Defendant Omron Oilfield and Marine Inc.'s Motion for Partial Summary Judgment of No Willful Infringement, 19 pages, May 13, 2011.

Case 6:09-cv-00414-LED Document 184 Filed May 25, 2011, *Canrig Drilling Technology Ltd.* v. *Omron Oilfield and Marine, Inc., and Helmerich & Payne, Inc.*, Defendant's Motion to Clarify the Court's Order (DKT#: 154) Regarding Amendment of Invalidity Contentions, or in the Alternative, *Reconsider the Order with Regard to the TESCO Top Drive*, 17 pages, May 25, 2011.

Case 6:09-cv-00414-LED Document 184 Filed May 25, 2011, Defendant's Motion to Clarify the Court's Order (DKT#: 154) Regarding Amendment of Invalidity Contentions, or in the Alternative, Reconsider the Order with Regard to the TESCO Top Drive, 146 pages, May 25, 2011.

Jean Michel Genevois, Jean Boulet, and Christophe Simon, Gyrostab Project : The Missing Link Azimuth and inclination mastered with new principles for standard rotary BHAs, Society of Petroleum Engineers, SPE/IADC 79915, Feb. 19, 2003.

Canrig Drilling Technology, Ltd., sales brochure for Directional Steering Control System (DSCS).

* cited by examiner

METHOD AND APPARATUS FOR DIRECTIONAL DRILLING

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The present invention relates generally to the field of oil and gas well drilling. More particularly, the present invention relates to a method and system for directional drilling in which the drill string is rotated back and forth between selected surface measured torque magnitudes without changing the tool face angle, thereby to reduce friction between the drill string and the well bore.

BACKGROUND OF THE INVENTION

It is very expensive to drill bore holes in the earth such as those made in connection with oil and gas wells. Oil and gas bearing formations are typically located thousands of feet below the surface of the earth. Accordingly, thousands of feet of rock must be drilled through in order to reach the producing formations. Additionally, many wells are drilled directionally, wherein the target formations may be spaced laterally thousands of feet from the well's surface location. Thus, in directional drilling, not only must the depth but also the lateral distance of rock must be penetrated.

The cost of drilling a well is primarily time dependent. Accordingly, the faster the desired penetration location, both in terms of depth and lateral location, is achieved, the lower the cost in completing While many operations are required to drill and complete a well, perhaps the most important is the actual drilling of the bore hole. In order to achieve the optimum time of completion of a well, it is necessary to drill at the optimum rate of penetration and to drill in the minimum practical distance to the target location. Rate of penetration depends on many factors, but a primary factor is weight on bit.

Directional drilling is typically performed using a bent sub mud motor drilling tool that is connected to the surface by a drill string. During sliding drilling, the drill string is not rotated; rather, the drilling fluid circulated through the drill string cause the bit of the mud motor drilling tool to rotate. The direction of drilling is determined by the azimuth or face angle of the drilling bit. Face angle information is measured downhole by a steering tool. Face angle information is typically conveyed from the steering tool to the surface using relatively low bandwidth mud pulse signaling. The driller attempts to maintain the proper face angle by applying torque or drill string angle corrections to the drill string.

Several problems in directional drilling are caused by the fact that a substantial length of the drill string is in frictional contact with and supported by the borehole. Since the drill string is not rotating, it is difficult to overcome the friction. The difficulty in overcoming the friction makes it difficult for the driller to apply sufficient weight to the bit to achieve an optimal rate of penetration. The drill string exhibits stick/slip friction such that when a sufficient amount of weight is applied to overcome the friction, the drill the weight on bit tends to overshoot the optimum magnitude.

Additionally, the reactive torque that would be transmitted from the bit to the surface through drill string, if the hole were straight, is absorbed by the friction between the drill string and the borehole. Thus, during drilling, there is substantially no reactive torque at the surface. Moreover, when the driller applies drill string angle corrections at the surface in an attempt to correct the bit face angle, a substantial amount of the angular change is absorbed by friction without changing the face angle in stick/slip fashion. When enough angular correction is applied to overcome the friction, the face angle may overshoot its target, thereby requiring the driller to apply a reverse angular correction.

It is known that the frictional engagement between the drill string and the borehole can be reduced by rocking the drill string back and forth between a first angle and a second angle. By rocking the string, the stick/slip friction is reduced, thereby making it easier for the driller to control the weight on bit and make appropriate face angle corrections.

SUMMARY OF THE INVENTION

The present invention provides a method and system for directional drilling that reduces the friction between the drill string and the well bore. According to the present invention, a downhole drilling motor is connected to the surface by a drill string. The drilling motor is oriented at a selected tool face angle. The drill string is rotated at the surface location in a first direction until a first torque magnitude is reached, without changing the tool face angle. The drill string is then rotated in the opposite direction until a second torque magnitude is reached, again without changing the tool face angle. The drill string is rocked back and forth between the first and second torque magnitudes.

DESCRIPTION OF THE PREFERRED EMBODIMENT

Figure 1:
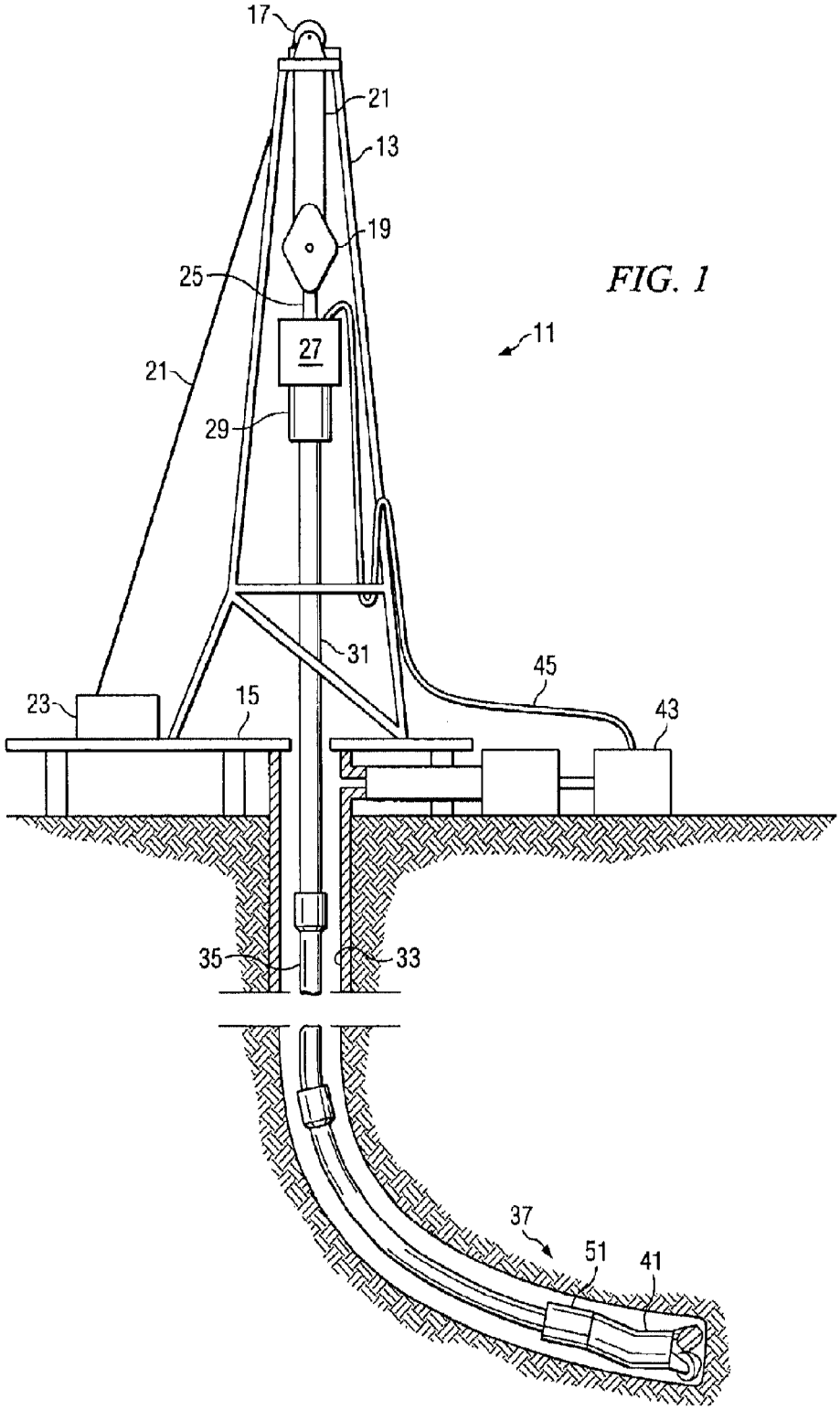
FIG. 1 is a pictorial view of a directional drilling system.

Referring now to the drawings and first to FIG. 1, a drilling rig is designated generally by the numeral 11. Rig 11 in FIG. 1 is depicted as a land rig. However, as will be apparent to those skilled in the art, the method and system of the present invention will find equal application to non-land rigs, such as jack-up rigs, semisubmersibles, drill ships, and the like.

Rig 11 includes a derrick 13 that is supported on the ground above a rig floor 15. Rig 11 includes lifting gear, which includes a crown block 17 mounted to derrick 13 and a traveling block 19. Crown block 17 and traveling block 19 are interconnected by a cable 21 that is driven by draw works 23 to control the upward and downward movement of traveling block 19. Traveling block 19 carries a hook 25 from which is suspended a top drive 27. Top drive 27 supports a drill siring, designated generally by the numeral 31, in a well bore 33. Top drive 27 can be operated to rotate drill string 31 in either direction.

According to an embodiment of the present invention, drill string 31 is coupled to top drive 27 through an instrumented sub 29. As will be discussed in detail hereinafter, instrumented top sub 29 includes sensors that provide drill string torque information according to the present invention.

Drill string 31 includes a plurality of interconnected sections of drill pipe 35 a bottom hole assembly (BHA) 37, which includes stabilizers, drill collars, and a suite of measurement while drilling (MWD) instruments including a steering tool 51. As will be explained in detail hereinafter, steering tool 51 provides bit face angle information according to the present invention.

A bent sub mud motor drilling tool 41 is connected to the bottom of BHA 37. As is well known to those skilled in the art, the face angle of the bit of drilling tool 41 used to control azimuth and pitch during sliding directional drilling. Drilling fluid is delivered to drill string 31 by mud pumps 43 through a mud hose 45. During rotary drilling, drill string 31 is rotated within bore hole 33 by top drive 27. As is well known to those skilled in the art, top drive 27 is slidingly mounted on parallel vertically extending rails (not shown) to resist rotation as torque is applied to drill string 31. During sliding drilling, drill string 31 is held in place by top drive 27 while the bit is rotated by mud motor 41, which is supplied with drilling fluid by mud pumps 43. The driller can operate top drive 27 to change the face angle of the bit of drilling tool 41. Although a top drive rig is illustrated, those skilled in the art will recognize that the present invention may also be used in connection with systems in which a rotary table and kelly are used to apply torque to the drill string The cuttings produced as the bit drills into the earth are carried out of bore hole 33 by drilling mud supplied by mud pumps 43.

Figure 2:
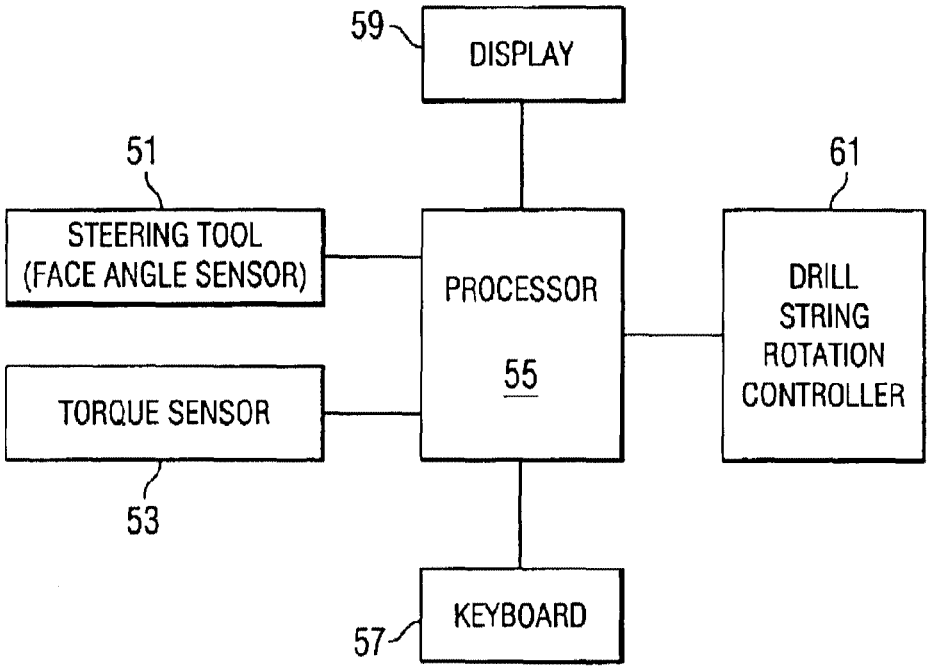
FIG. 2 is a block diagram of a directional driller control system according to the present invention.

Referring now to FIG. 2, there is shown a block diagram of a preferred system of the present invention. The system of the present invention includes a steering tool 51, which produces a signal indicative of drill bit face angle. Typically, steering tool 51 uses mud pulse telemetry to send signals to a surface receiver (not shown), which outputs a digital face angle signal. However, because of the limited bandwidth of mud pulse telemetry, the face angle signal is produced at a rate of once every several seconds, rather than at the preferred five times per second sampling rate. For example, the sampling rate for the face angle signal may be about once every twenty seconds.

The system of the present invention also includes a drill string torque sensor 53, which provides a measure of the torque applied to the drill string at the surface. The drill string torque sensor may implemented as a strain gage in instrumented top sub 29 (illustrated in FIG. 1). The torque sensor 53 may also be implemented as a current measurement device for an electric rotary table or top drive motor, or as pressure sensor for an hydraulically operated top drive. The drill string torque sensor 53 provides a signal that may be sampled at the preferred sampling rate of five times per second.

In FIG. 2, the outputs of sensors 51 and 53 are received at a processor 55. Processor 55 is programmed according to the present invention to process data received from sensors 51-53. Processor 55 receives user input from user input devices, such as a keyboard 57. Other user input devices such as touch screens, keypads, and the like may also be used. Processor 55 provides visual output to a display 59. Processor 55 also provides output to a drill string rotation controller 61 that operates the top drive (27 in FIG. 1) or rotary table to rotate the drill string according to the present invention.

According to the present invention, drilling, tool 41 is oriented at tool face angle selected to achieve a desired trajectory. As drilling tool 41 is advanced into the hole, processor 55 operates drill string rotation controller 61 to rotate drill string 35 in a first direction while monitoring drill string torque with torque sensor 53 and tool face angle with steering tool 51. As long as the tool face angle remains constant, rotation controller 61 continues to rotate drill string 35 in the first direction. When the steering tool 51 senses a change in tool face angle, processor 55 notes the torque magnitude measured by torque sensor 53 and actuates drill string rotation controller 61 to reverse the direction of rotation of drill string 31. Torque is a vector having a magnitude and a direction. When torque sensor 53 senses that the magnitude of the drill string torque has reached the magnitude measured in the first direction, processor 55 actuates rotation controller 61 reverse the direction of rotation of drill string 31. As drilling progresses, processor 55 continues to monitor drill torque with torque sensor 53 and actuates rotation controller 61 to rotate drill string 31 back and forth between the first torque magnitude and the second torque magnitude. The back and forth rotation reduces or eliminates stick/slip friction between the drill string and the well bore, thereby making it easier for the driller to control weight on bit and tool face angle.

Alternatively, the torque magnitude may be preselected by the system operator. When the torque detected by the torque sensor 53 reaches the preselected value, the processor 55 sends a signal to the controller 61 to reverse direction of rotation. The rotation in the reverse direction continues until the preselected torque value is reached again. In some embodiments, the preselected torque value is determined by calculating an expected rotational friction between the drill string (35 in FIG. 1) and the wellbore wall, such that the entire drill string above a selected point is rotated. The selected point is preferably a position along the drill string at which reactive torque from the motor 41 is stopped by friction between the drill string and the wellbore wall. The selected point may be calculated using "torque and drag" simulation computer programs well known in the art. Such programs calculate axial force and frictional/lateral force at each position along the drill string for any selected wellbore trajectory. One such program is sold under the trade name WELLPLAN by Landmark Graphics Corp., Houston, Tex.

While the invention has been disclosed with respect to a limited number of embodiments, those of ordinary skill in the art, having the benefit of this disclosure, will readily appreciate that other embodiments may be devised which do not depart from the scope of the invention. Accordingly, the scope of the invention is intended to be limited only by the attached claims.

What is claimed is:

1. A method of drilling a well, which comprises:

(a) orienting a downhole drilling motor at a selected face angle, said drilling motor being connected by a drill string to a surface drilling location;

(b) rotating said drill string at said surface location in a first direction until a first measured torque magnitude is reached at said surface location; and then, (c) rotating said drill string in the direction opposite said first direction until a second measured torque magnitude is reached at said surface location.

2. The method as claimed in claim 1, including repeating steps (b) and (c) while drilling with said drilling motor.

3. The method as claimed in claim 1, wherein said second torque magnitude is substantially equal to said first torque magnitude.

4. The method as claimed in claim 1, wherein said second torque magnitude is less than said first torque magnitude.

5. The method as claimed in claim 1, wherein:

said drill string is rotated in said first direction to said first torque magnitude without changing said face angle; and, said drill string is rotated in said direction opposite said first direction to said second torque magnitude without changing said face angle.

6. The method as claimed in claim 5, wherein said second torque magnitude is substantially equal to said first torque magnitude.

7. The method as claimed in claim 5, wherein said second torque magnitude is less than said first torque magnitude.

8. The method as defined in claim 1 wherein said first torque magnitude is selected so that the drill string is rotated to a selected position therealong.

9. The method as defined in claim 8 wherein the selected position along the drill string is a position at which reactive torque from said drilling motor substantially is stopped by friction between the drill string and a wall of a wellbore.

10. A method of drilling a well, which comprises:

(a) determining the face angle of a downhole drilling motor, said downhole drilling motor being connected to a surface location by a drill string;

(b) rotating said drill string at said surface location in a first direction until a first measured torque magnitude is reached at said surface location without changing said face angle; and then (c) rotating said drill string in the direction opposite said first direction until a second measure torque magnitude is reached at said surface location without changing said face angle.

11. The method as claimed in claim 10, including repeating steps (a) and (b) while drilling with said drilling motor.

12. The method as claimed in claim 10, wherein said second torque magnitude is substantially equal to said first torque magnitude.

13. The method as claimed in claim 10, wherein said second torque magnitude is less than said first torque magnitude.

14. A directional drilling system, which comprises:

a torque sensor for determining torque applied to a drill string by rotating means;

a controller for operating said rotating means to rotate said drill string in a first direction until a first torque magnitude is determined and then in a direction opposite said first direction until a second torque magnitude is determined.

15. The system as claimed in claim 14, wherein said second torque magnitude is substantially equal to said first torque magnitude.

16. The system as claimed in claim 14, wherein said controller operates said rotating means to rotate said drill string until said first and second torque magnitudes are reached without changing bit face angle.

17. The system as claimed in claim 14 further comprising means for calculating a value of said first torque magnitude such that said drill string is rotated to a position along said drill string at which reactive torque from a drilling motor is stopped by friction between the drill string and a wall of a wellbore.

18. The system as claimed in claim 14, wherein said second torque magnitude is less than said first torque magnitude.

19. The system as claimed in claim 14, wherein said rotating means comprises a top drive.

20. The system as claimed in claim 14, wherein said rotating means comprises a rotary table.

*21. A method of drilling a well, comprising:*

*(a) orienting a downhole drilling motor to a selected face angle, said downhole drilling motor being connected to a surface location by a drill string;*

*(b) automatically rotating said drill string at said surface location in a first direction until a first measured torque magnitude is reached at said surface location without changing said face angle; and then*

*(c) automatically rotating said drill string in the direction opposite said first direction until a second measured torque magnitude is reached at said surface location without changing said face angle.*

*22. The method as claimed in claim 21, including repeating (b) and (c) while drilling the well with said drilling motor.*

*23. The method as claimed in claim 21, wherein said second torque magnitude is substantially equal to said first torque magnitude.*

*24. The method as claimed in claim 21, wherein said second torque magnitude is less than said first torque magnitude.*

*25. A directional drilling system, comprising:*

*a torque sensor for determining torque applied to a drill string by a rotating means proximate a surface location; and*

*a controller in signal communication with the torque sensor, the controller operating said rotating means to automatically rotate said drill string in a first direction until a first torque magnitude is determined by the torque sensor, the controller then operating the rotating means to automatically rotate said drill string in a direction opposite said first direction until a second torque magnitude is determined by the torque sensor.*

*26. The system as claimed in claim 25, wherein said first and said second torque magnitudes are substantially equal.*

*27. The system as claimed in claim 25, wherein said controller operates said rotating means to automatically rotate said drill string until said second torque magnitude is reached without changing a bit face angle.*

*28. The system as claimed in claim 25 further comprising means for calculating a value of said first torque magnitude such that said drill string is automatically rotated to a position along said drill string at which reactive torque from a drilling motor is substantially stopped by friction between the drill string and a wall of a wellbore.*

*29. The system as claimed in claim 25, wherein said second torque magnitude is less than said first torque magnitude.*

*30. The system as claimed in claim 25, wherein said rotating means comprises a top drive.*

*31. The system as claimed in claim 25, wherein said surface drive system comprises a rotary table.*

*32. A method of drilling a well, comprising:*

*(a) selecting a first torque value;*

*(b) orienting a downhole drilling motor at a selected face angle; the drilling motor being connected by a drill string to a surface drilling location;*

*(c) automatically rotating a drill string at a surface location in a first direction;*

*(d) measuring a first torque magnitude at said surface location;*

*(e) automatically changing rotation of said drill string to the direction opposite said first direction when said first torque magnitude is equal to said first selected torque value;*

*(f) measuring a second torque magnitude at said surface location and continuing rotation of said drill string in said direction opposite to said first direction until a second selected torque value is reached; and then*

*(g) automatically changing rotation of said drill string to the first direction when said second torque magnitude is equal to said second selected torque value.*

*33. The method as claimed in claim 32, further comprising repeating (c) through (g) while drilling the well with a drilling motor.*

*34. The method as claimed in claim 32, wherein said first and said second selected torque values are substantially equal.*

*35. The method as claimed in claim 32, wherein said second selected torque value is less than said first selected torque value.*

*36. The method as claimed in claim 32 wherein said first selected torque value is selected so that the drill string is rotated to a selected axial position therealong.*

*37. The method as claimed in claim 36 wherein the selected position along the drill string is a position at which reactive torque from a drilling motor is substantially stopped by friction between the drill string and a wall of a wellbore.*

* * * * *

UNITED STATES PATENT AND TRADEMARK OFFICE

CERTIFICATE OF CORRECTION

PATENT NO. : RE45,898 E
APPLICATION NO. : 13/854058
DATED : February 23, 2016
INVENTOR(S) : Maidla et al.

It is certified that error appears in the above-identified patent and that said Letters Patent is hereby corrected as shown below:

In the Specification

Please insert Line 11 (approx.) of Column 1 as follows:
--*Notice: More than one reissue application has been filed for the reissue of U.S. Patent No. 6,802,378. The reissue applications are U.S. Reissue Patent Application Serial No. 14/279,669, filed on May 16, 2014, now U.S. Reissue Patent No. RE46,090 E, issued August 2, 2016, which is a continuation reissue application of U.S. Reissue Patent Application Serial No. 13/854,058 (the present application), filed on March 30, 2013, now U.S. Reissue Patent No. RE45,898 E, issued February 23, 2016.*--

Signed and Sealed this
Twelfth Day of June, 2018

Andrei Iancu

Andrei Iancu
*Director of the United States Patent and Trademark Office*